United States Patent
Moon et al.

(10) Patent No.: US 10,491,374 B2
(45) Date of Patent: Nov. 26, 2019

(54) APPARATUS AND METHOD FOR ENCRYPTION

(71) Applicants: SAMSUNG SDS CO., LTD., Seoul (KR); CARMEL HAIFA UNIVERSITY ECONOMIC CORP. LTD., Haifa (IL); BAR-ILAN UNIVERSITY, Ramat Gan (IL)

(72) Inventors: Duk-Jae Moon, Seoul (KR); Ji-Hoon Cho, Seoul (KR); Kyu-Young Choi, Seoul (KR); Nathan Keller, Ramat Gan (IL); Orr Dunkelman, Haifa (IL); Itai Dinur, Haifa (IL)

(73) Assignees: SAMSUNG SDS CO., LTD., Seoul (KR); CARMEL HAIFA UNIVERSITY ECONOMIC CORP. LTD., Haifa (IL); BAR-ILAN UNIVERSITY, Ramat-Gan (IL)

( * ) Notice: Subject to any disclaimer, the term of this patent is extended or adjusted under 35 U.S.C. 154(b) by 525 days.

(21) Appl. No.: 14/980,751

(22) Filed: Dec. 28, 2015

(65) Prior Publication Data
US 2017/0126396 A1      May 4, 2017

(30) Foreign Application Priority Data
Oct. 29, 2015    (KR) .................. 10-2015-0151039

(51) Int. Cl.
*H04L 9/06* (2006.01)
*H04L 9/08* (2006.01)

(52) U.S. Cl.
CPC .......... *H04L 9/0625* (2013.01); *H04L 9/0631* (2013.01); *H04L 9/0869* (2013.01)

(58) Field of Classification Search
CPC .... H04L 9/0625; H04L 9/0869; H04L 9/0631
(Continued)

(56) References Cited

U.S. PATENT DOCUMENTS

| | | | |
|---|---|---|---|
| 5,995,915 A * | 11/1999 | Reed .............. | G01R 31/318307 702/119 |
| 8,130,946 B2 * | 3/2012 | De Mare .............. | H04L 9/0618 380/28 |

(Continued)

FOREIGN PATENT DOCUMENTS

| | | |
|---|---|---|
| KR | 10-2008-0080175 A | 9/2008 |
| KR | 10-2012-0030335 A | 3/2012 |

OTHER PUBLICATIONS

Communication dated May 22, 2017 by the Korean Intellectual Property Office in counterpart Korean Application No. 10-2015-0151039.

(Continued)

*Primary Examiner* — Khalil Naghdali
*Assistant Examiner* — Aubrey H Wyszynski
(74) *Attorney, Agent, or Firm* — Sughrue Mion, PLLC (57) ABSTRACT

Disclosed are an apparatus and a method for encryption. The apparatus includes a key table generator configured to generate random values based on a seed value and generate a key table including the generated random values; and an encryptor configured to apply the generated key table to a round function, generate a block encryption algorithm having a Feistel structure based on the round function, and encrypt a plaintext data block based on the generated block encryption algorithm.

11 Claims, 6 Drawing Sheets

(58) Field of Classification Search
USPC .......................................................... 380/28
See application file for complete search history.

(56) References Cited

U.S. PATENT DOCUMENTS

| | | | |
|---|---|---|---|
| 9,152,801 B2* | 10/2015 | Cooke | H04L 9/0618 |
| 2009/0080647 A1* | 3/2009 | Mantin | H04L 9/0637 |
| | | | 380/29 |
| 2012/0002807 A1 | 1/2012 | Michiels et al. | |
| 2016/0112188 A1* | 4/2016 | Choi | G09C 1/00 |
| | | | 380/28 |

OTHER PUBLICATIONS

Communication dated Feb. 26, 2018 issued by the Korean Intellectual Property Office in counterpart Korean Patent Application No. 10-2015-0151039.
Lee, Man-Young et al., "Modern Cryptography and Applications", KIISC Press, Nov. 25, 2002, pp. 62-67 (total 8 pages), vol. 3.
Communication dated Jul. 3, 2019, issued by the Chinese Patent Office in counterpart Chinese Application No. 201610108510.X.

* cited by examiner

APPARATUS AND METHOD FOR ENCRYPTION

CROSS-REFERENCE TO RELATED APPLICATION

This application claims priority to and the benefit of Korean Patent Application No. 10-2015-0151039, filed on Oct. 29, 2015, the disclosure of which is incorporated herein by reference in its entirety.

BACKGROUND

1. Field

The present disclosure relates to technology of encryption.

2. Discussion of Related Art

A conventional white box cipher algorithm is provided with an implementation method thereof varied with internal characteristics of a symmetric key cipher algorithm that serves as an underlying algorithm, exhibits difficulty in providing a wide use due to its dependency on the underlying algorithm, and has an efficiency tens of times lower than the underlying algorithm due to an insertion of a number of additional operations to protect a cryptographic key of the underlying algorithm.

In addition, the conventional white box cipher algorithm does not provide sufficient security desired by a designer, and is exposed to the risk of real-time cryptographic key recovery attack.

SUMMARY

The present disclosure is directed to an apparatus and method for encryption.

According to an aspect of an exemplary embodiment, there is provided an apparatus for encryption, the apparatus including: a key table generator configured to generate random values based on a seed value and generate a key table including the generated random values; and an encryptor configured to apply the generated key table to a round function, generate a block encryption algorithm having a Feistel structure based on the round function, and encrypt a plaintext data block based on the generated block encryption algorithm The seed value may be an initial input value that is input to the key table generator and is represented as a bit string.

The bit string may correspond to one of a cryptographic key, a counter value, and an initialization vector.

The key table generator may determine sizes of the random values based on a size of an available memory for encryption.

The encryptor may determine the number of branches of the block encryption algorithm based on a size of the plaintext data block and the sizes of the random values, and generate the block encryption algorithm having the determined number of branches.

The encryptor may determine the number of branches based on a following Equation:

$$b = \frac{n}{k}, b > 2, k \geq 3$$

wherein b is the number of branches, n is a size of the plaintext data block, and k is one of the sizes of the random values.

The encryptor may determine the number of rounds of the block encryption algorithm based on a security level, and generate the block encryption algorithm having the determined number of rounds.

According to an aspect of another exemplary embodiment, there is provided a method for encryption, the method including generating random values based on a seed value; generating a key table including the generated random values; applying the generated key table to a round function; generating a block encryption algorithm having a Feistel structure based on the round function, and encrypting a plaintext data block based on the generated block encryption algorithm.

The seed value may be an initial input value that is input to the key table generator and is represented as a bit string.

The bit string may correspond to one of a cryptographic key, a counter value, and an initialization vector.

The generating of the random values may include determining sizes of the random values based on a size of an available memory for encryption, and generating random values having the determined sizes of the random values.

The generating of the block encryption algorithm may include determining the number of branches of the Feistel structure based on a size of the plaintext data block and the sizes of the random values, and generating the block encryption algorithm having the determined number of branches.

In the determining of the number of branches, the number of branches may be determined based on a following Equation:

$$b = \frac{n}{k}, b > 2, k \geq 3$$

wherein b is the number of branches, n is a size of the plaintext data block and k is one of the sizes of the random values.

The generating of the block encryption algorithm may include, determining the number of rounds of the Feistel structure based on a security level, and generating a block encryption algorithm having the determined number of rounds.

According to an aspect of another exemplary embodiment, there is provided a non-transitory computer readable storage medium storing a program that is executable by a computer to perform a method including: generating random values based on a seed value; generating a key table including the generated random values; applying the generated key table to a round function; generating a block encryption algorithm having a Feistel structure based on the round function, and encrypting a plaintext data block based on the generated block encryption algorithm.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present disclosure will be described in detail below with reference to the accompanying drawings. The following description is intended to provide a general understanding of the method, apparatus, and/or system described in the specification, but it is illustrative in purpose only and should not be construed as limiting the present disclosure.

In describing the present disclosure, detailed descriptions that are well-known but are likely to obscure the subject matter of the present disclosure will be omitted in order to avoid redundancy. The terminology used herein is defined in consideration of its function in the present disclosure, and may vary with an intention of a user and an operator or custom. Accordingly, the definition of the terms should be determined based on overall contents of the specification. The terminology used herein is for the purpose of describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
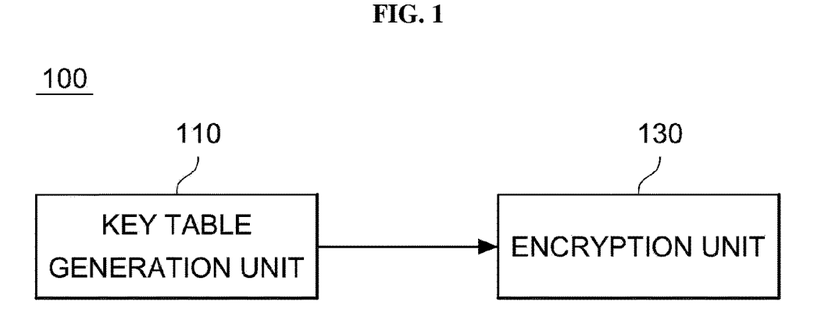
FIG. 1 is a block diagram illustrating an apparatus for encryption according to an exemplary embodiment of the present disclosure.

FIG. 1 is a block diagram illustrating an apparatus for encryption according to an exemplary embodiment of the present disclosure.

Referring to FIG. 1, an apparatus for encryption 100 according to an exemplary embodiment of the present disclosure includes a key table generation unit 110 and an encryption unit 130. The apparatus may be implemented by a computing device, a processor, or a central processing unit (CPU).

The key table generation unit 110 generates random values derived from a seed value by using the seed value, and generates a key table including the generated random values.

The key table may represent a lookup table composed of the random values derived from the seed value.

In addition, the seed value may represent an initial input value that is able to be represented in a bit string. For example, the seed value may include a cryptographic key, a counter value used in an operation mode of a block encryption, and an initialization vector composed of a random bit string.

Meanwhile, according to an exemplary embodiment of the present disclosure, the respective random values of the key table generated by the key table generation unit 110 may have sizes determined according to a size of an available memory used for encryption in a computing environment to which the apparatus for encryption 100 is applied.

The encryption unit 130 may encrypt a plaintext data block by generating a block encryption algorithm of a Feistel structure having a round function to which the key table generated by the key table generation unit 110 is applied, and using the generated block encryption algorithm.

In detail, the encryption unit 130 may generate a block encryption algorithm by determining the number of branches and the number of rounds of a Feistel structure, and applying a key table to each round of the Feistel structure.

In this case, according to an exemplary embodiment of the present disclosure, the block encryption algorithm formed by the encryption unit 130 may be generated based on a general block encryption algorithm having a Feistel structure (for example, a Date Encryption Standard (DES) algorithm). For example, based on the DES algorithm, the encryption unit 130 may generate a block encryption algorithm by applying a key table to each round function of a Feistel structure according to the DES algorithm, and changing the number of branches and the number of rounds of the Feistel structure.

Meanwhile, according to the exemplary embodiment of the present disclosure, the number of branches of a Feistel structure may be determined based on a size of a plaintext data block to be encrypted and sizes of random values forming a key table. In detail, for example, the encryption unit 130 may determine the number of branches b of a Feistel structure based on Equation 1 shown below.

$$b = \frac{n}{k}, b > 2, k \geq 3 \qquad \text{[Equation 1]}$$

In Equation 1, n is a size (bit) of a plaintext data block to be encrypted and k is a size of a random value forming a key table.

According to the exemplary embodiment of the present disclosure, the number of rounds of a Feistel structure may be determined based on a security level in an environment to which the apparatus for encryption 100 is applied.

Figure 2:
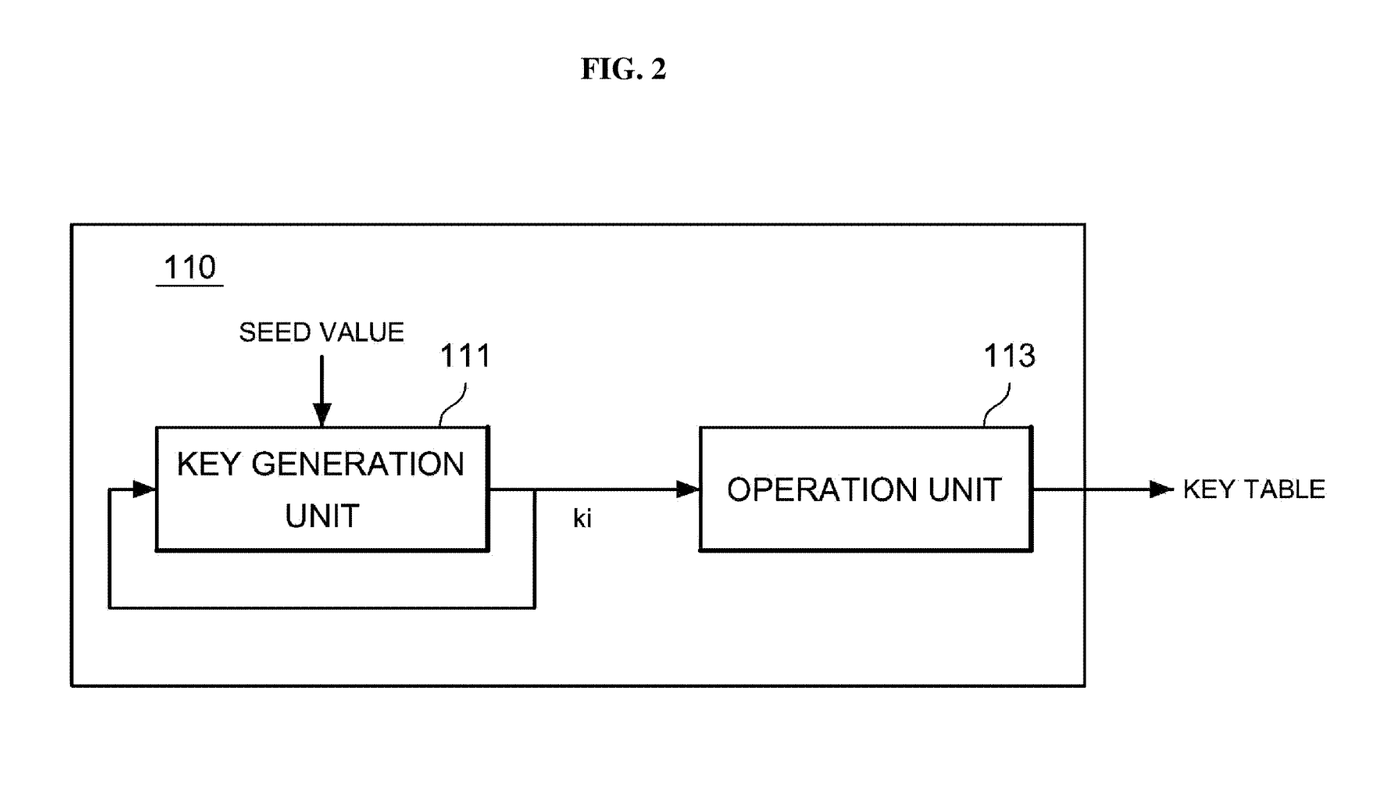
FIG. 2 is a detailed diagram illustrating a key table generation unit according to an exemplary embodiment of the present disclosure.

FIG. 2 is a detailed diagram illustrating the key table generation unit 110 according to an exemplary embodiment of the present disclosure.

Referring to FIG. 2, the key table generation unit 110 may include a key generation unit 111 to generate a plurality of sub keys from a seed value and an operation unit 113 to generate a key table by using the respective sub keys.

In detail, the key generation unit 111 may generate a sub key by receiving a seed value, and repeatedly generate a new sub key from the sub key that was just generated. For example, when it is assumed that three sub keys are generated, the key generation unit 111 may generate a random number from an input seed value to generate a first sub key. Then, the key generation unit 111 may generate a random number from the generated first sub key to generate a second sub key, and generate a random number from the generated second sub key to generate a third sub key.

The operation unit 113 generates random values to form a key table from the respective sub keys generated from the key generation unit 111, and generates the key table including the generated random values. In detail, the operation unit 113 may generate random values by applying each sub key to a round function every round by using a round function that is configured to generate random values from input sub keys.

Figure 3:
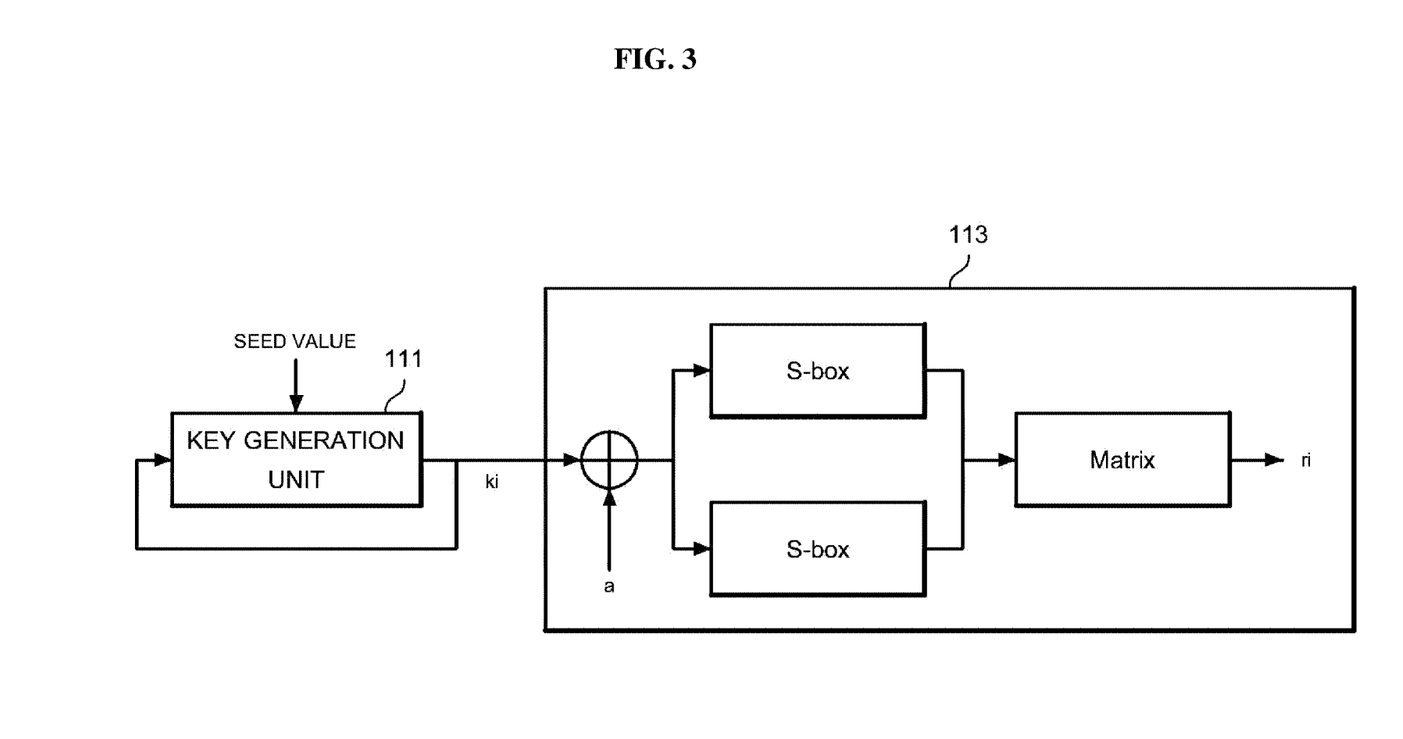
FIG. 3 is a diagram illustrating a round function used in an operation unit.

In detail, FIG. 3 is a diagram illustrating a round function used in the operation unit 113.

Referring to FIG. 3, the operation unit 113 performs an XOR operation on a sub key ki generated from the key generation unit 111 and a random value (a) having the same size as that of the sub key ki, and divides an XOR operation result into two parts that are then applied to S-boxes, respectively. Thereafter, the operation unit 113 performs a matrix operation on output result values of the two S-boxes to generate a random value ri. The matrix operation may be provided using various types of matrix operations having a property that may maximize a diffusion effect on an input value, for example, a Maximum Distance Separable (MDS) matrix.

Meanwhile, the generating of the key table performed by the key table generation unit 110 is not limited to FIGS. 2 and 3. For example, unlike the examples of FIGS. 2 and 3, the key table generation unit 110 may generate random values from a seed value by using various methods having a one-way property, and generate a key table including the generated random values.

Figure 4:
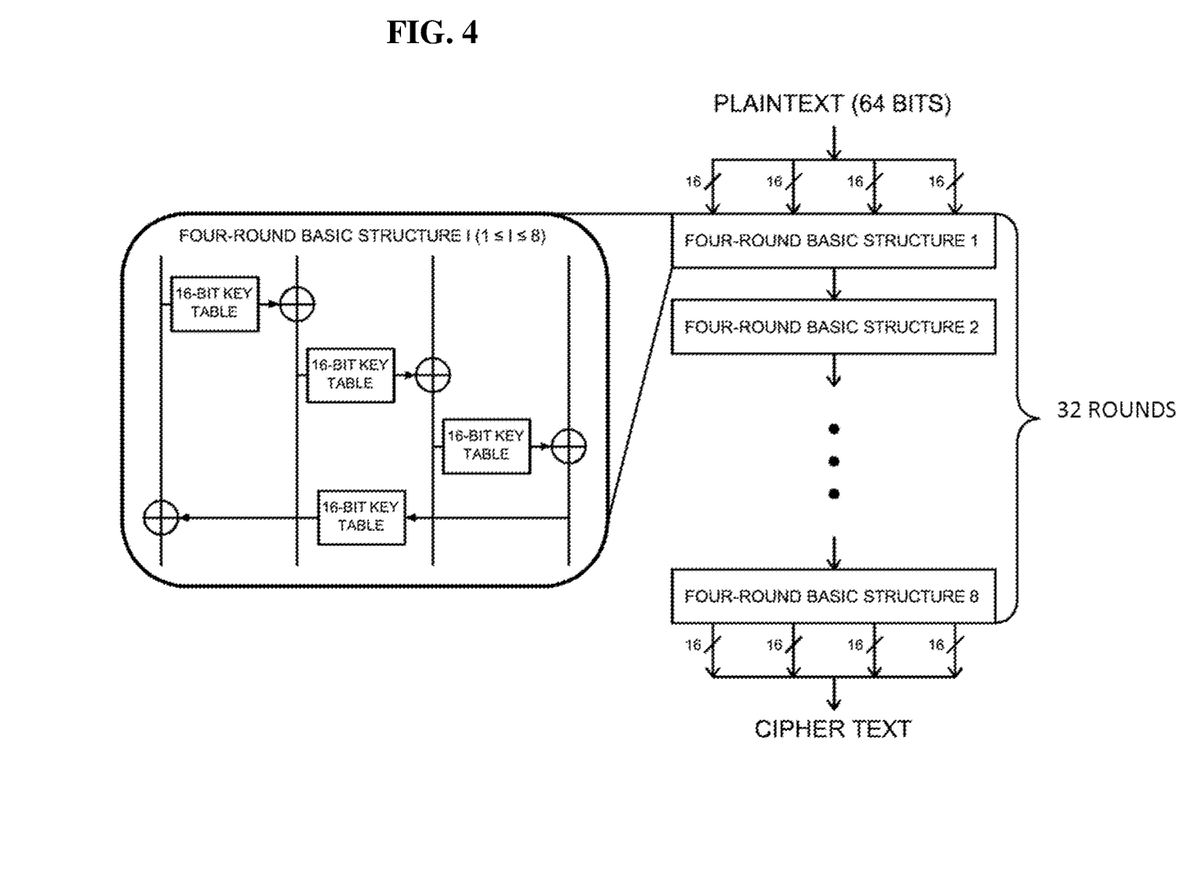
FIG. 4 is a diagram illustrating a Feistel structure of a block encryption algorithm generated according to an exemplary embodiment of the present disclosure.

FIG. 4 is a diagram illustrating a Feistel structure of a block encryption algorithm generated according to an exemplary embodiment of the present disclosure.

In FIG. 4, it may be assumed that a size of a plaintext data block to be encrypted is 64 bits and a size of each of random values forming a key table is 16 bits.

The encryption unit 130 may constitute a Feistel structure, for example, having a four-round basic structure as shown in FIG. 4, including four branches according to Equation 1 and using a key table as a round function such that the four-round basic structure is repeated according to the number of rounds determined by the security level (illustrated as 32 rounds in FIG. 4).

Meanwhile, referring to the basic structure, in the first round, a block value input into a branch that is arranged first at the left side of the drawing is converted into a corresponding random value in the key table, and the converted random value is combined with a block value being input into a second branch through an XOR operation. Then, in the second round, a value generated in the first round is converted into a corresponding random value in the key table, and the converted random value is combined with a block value being input into a third branch through an XOR operation. Then, in the same manner, the third and fourth rounds are performed, and in the fourth round, a random value converted through the key table is combined with the block value being input into the first branch through the XOR operation.

Meanwhile, the Feistel structure shown in FIG. 4 should be considered illustrative, and the Feistel structure according to exemplary embodiments of the present disclosure is not limited thereto. That is, the Feistel structure according to exemplary embodiments may be provided in various forms depending on a block encryption algorithm serving as an underlying algorithm.

In addition, although the example shown in FIG. 4 uses a key table as a round function of each round of a Feistel structure, the present disclosure is not limited thereto. For example, a round function of each round may be obtained by changing a part of a round function used in a block encryption algorithm serving as an underlying algorithm into a key table.

Meanwhile, according to the exemplary embodiment of the present disclosure, the key table generation unit 110 and the encryption unit 130 illustrated in FIG. 1 may be implemented on one or more computing devices including one or more processors and a computer readable recording medium connected to the processor. The computer readable recording medium may be provided inside or outside of the processor, and may be connected to the processor by generally known means. The processor in the computing device may allow the computing device to operate according to the exemplary embodiment described in this specification. For example, the processor may execute an instruction stored in the computer readable recording medium, and when the instruction stored in the computer readable recording medium is executed by the processor, operations according to the exemplary embodiments described in this specification are performed by the computing device.

Figure 5:
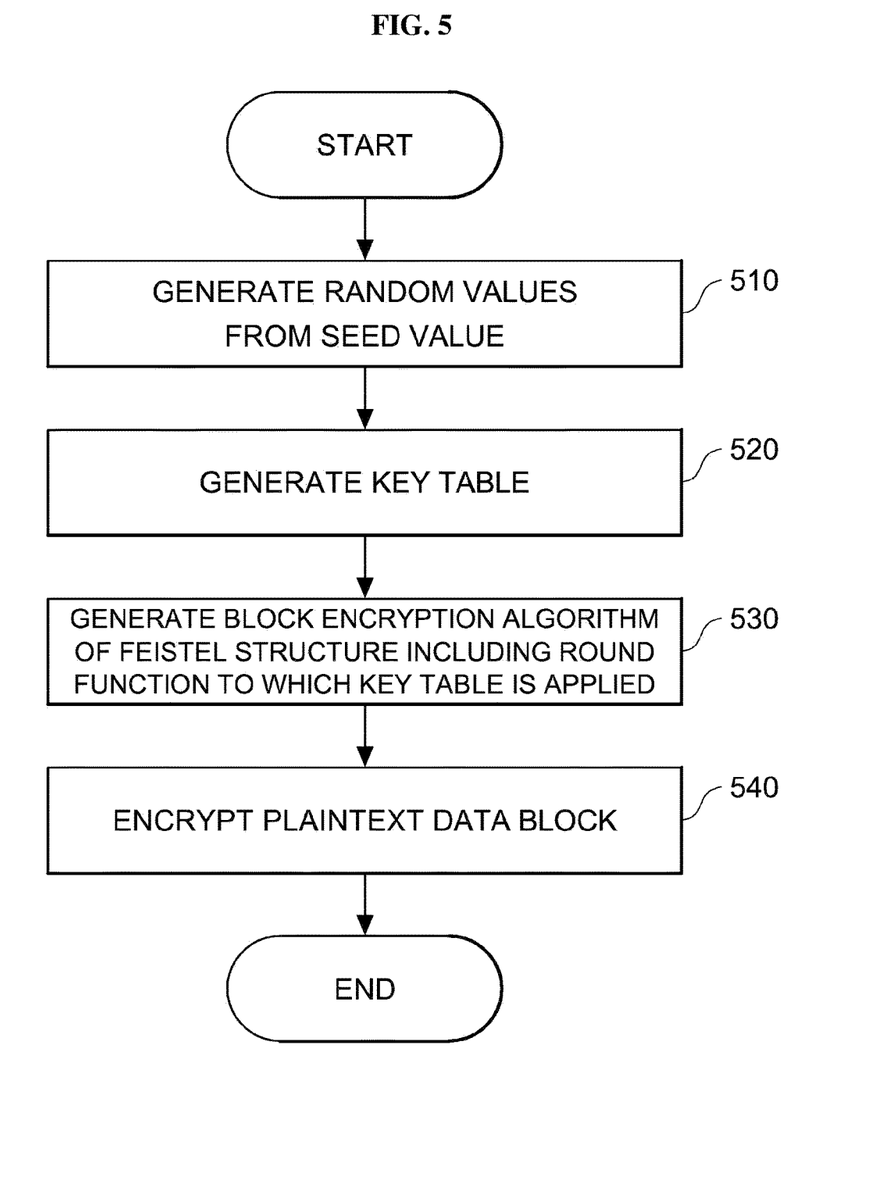
FIG. 5 is a flowchart showing a method for encryption according to an exemplary embodiment of the present disclosure.

FIG. 5 is a flowchart showing a method for encryption according to an exemplary embodiment of the present disclosure.

For example, the method illustrated in FIG. 5 may be performed by the apparatus for encryption 100 illustrated in FIG. 1.

Referring to FIG. 5, the apparatus for encryption 100 generates random values derived from a seed value (S510).

Then, the apparatus for encryption 100 generates a key table including the generated random values (S520). In this case, sizes of the random values forming the key table may be determined according to a size of an available memory.

Then, the apparatus for encryption 100 generates a block encryption algorithm of a Feistel structure having a round function to which the generated key table is applied (S530).

Then, the apparatus for encryption 100 encrypts a plaintext data block by using the generated block encryption algorithm (S540).

Figure 6:
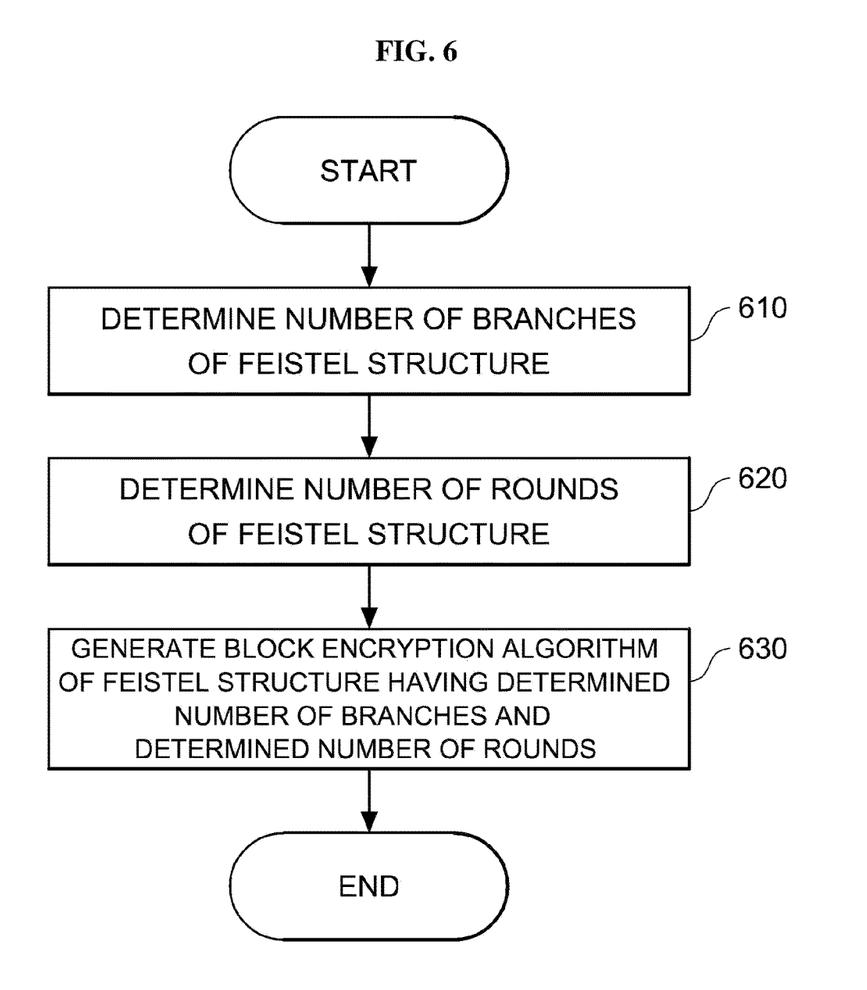
FIG. 6 is a flowchart showing a procedure of generating a block encryption algorithm according to an exemplary embodiment of the present disclosure.

FIG. 6 is a flowchart showing a procedure of generating a block encryption algorithm according to an exemplary embodiment of the present disclosure.

Referring to FIG. 6, the apparatus for encryption 100 may determine the number of branches of the Feistel structure based on a size of the plaintext data block and sizes of the random values forming the key table (S610).

Then, the apparatus for encryption 100 may determine the number of rounds of Feistel structure based on a security level of encryption (S620).

Then, the apparatus for encryption 100 may generate a block encryption algorithm of the Feistel structure having the determined number of branches and the determined number of rounds (S630).

Meanwhile, in the flow charts shown in FIGS. 5 and 6, the method is illustrated as being divided into a plurality of operations. However, at least one operation of the operations may be performed in a changed order, concurrently performed in combination with other operations, omitted, subdivided, or one or more operations which are not illustrated in the diagram may be added.

Meanwhile, the embodiments of the present disclosure may include a computer readable recording medium including a program to perform the methods described in the specification on a computer. The computer readable recording medium may include a program instruction, a local data file, a local data structure, or a combination of one or more of these. The medium may be designed and constructed for the present disclosure, or generally used in the computer software field. Examples of the computer readable recording medium include hardware device constructed to store and execute a program instruction, for example, a magnetic media such as hard disks, floppy disks, and magnetic tapes, optical media such as compact disc read-only memories (CD-ROMs), and digital versatile discs (DVDs), magneto-optical media such as floptical disk, read-only memories (ROM), random access memories (RAM), and flash memories. In addition, the program instruction may include a machine code made by a compiler, and a high-level language executable by a computer through an interpreter.

The above-described devices may be implemented using hardware components and software components. For example, the above modules of apparatus for encryption 100 may be implemented using hardware components. The hardware components may include a processor and a memory.

The processor may be a controller and an arithmetic logic unit, a digital signal processor, a microcomputer, a field programmable array, a programmable logic unit, a microprocessor or any other device capable of responding to and executing instructions in a defined manner such that the processor is programmed with instructions that configure the processing device as a special purpose computer configured to perform the embodiments of the present disclosure.

As is apparent from the above, an encryption algorithm of a Feistel structure, in which a key table is applied to a round function, capable of protecting a cryptographic key in a white box environment is used, thereby ensuring secure encryption of data in a white box environment without an additional operation process to protect a cryptographic key.

In addition, the size of a key table and the number of branches and rounds of a Feistel structure are variably adjusted according to an encryption application environment, thereby generating an encryption algorithm optimized for the application environment.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An apparatus for encryption, the apparatus comprising:
   a key table generator configured to generate random values based on a seed value and generate a key table including the generated random values; and
   an encryptor configured to apply the generated key table to a round function, generate a block encryption algorithm having a Feistel structure based on the round function, and encrypt a plaintext data block based on the generated block encryption algorithm,
   wherein the key table generator is further configured to determine sizes of the random values based on a size of a memory available for encryption and to generate the random values having the determined sizes of the random values,
   wherein the encryptor is further configured to determine a number of branches of the block encryption algorithm based on a size of the plaintext data block and sizes of the random values, and generate the block encryption algorithm having the determined number of branches.

2. The apparatus for encryption of claim 1, wherein the seed value is an initial input value that is input to the key table generator and is represented as a bit string.

3. The apparatus for encryption of claim 2, wherein the bit string corresponds to one of a cryptographic key, a counter value, and an initialization vector.

4. The apparatus for encryption of claim 1, wherein the encryptor is further configured to determine the number of branches based on the following Equation:

$$b = \frac{n}{k}, b > 2, k \geq 3$$

wherein b is the number of branches, n is a size of the plaintext data block, and k is one of the sizes of the random values, and wherein b, n, and k are integers.

5. The apparatus for encryption of claim 1, wherein the encryptor is further configured to determine a number of rounds of the block encryption algorithm based on a security level, and generate the block encryption algorithm having the determined number of rounds.

6. A method for encryption, the method comprising:
   generating random values based on a seed value;
   generating a key table including the generated random values;
   applying the generated key table to a round function;
   generating a block encryption algorithm having a Feistel structure based on the round function, and
   encrypting a plaintext data block based on the generated block encryption algorithm,
   wherein the generating the random values comprises:
   determining sizes of the random values based on a size of a memory available for encryption; and
   generating the random values having the determined sizes of the random values,
   wherein the generating the block encryption algorithm comprises:
   determining a number of branches of the Feistel structure based on a size of the plaintext data block and sizes of the random values; and
   generating the block encryption algorithm having the determined number of branches.

7. The method for encryption of claim 6, wherein the random values is generated by a key table generator, and the seed value is an initial input value that is input to the key table generator and is represented as a bit string.

8. The method for encryption of claim 7, wherein the bit string corresponds to one of a cryptographic key, a counter value, and an initialization vector.

9. The method for encryption of claim 6, wherein the determining the number of branches comprises determining the number of branches based on the following Equation:

$$b = \frac{n}{k}, b > 2, k \geq 3$$

wherein b is the number of branches, n is a size of the plaintext data block and k is one of the sizes of the random values, and wherein b, n, and k are integers.

10. The method for encryption of claim 6, wherein the generating the block encryption algorithm comprises:
    determining a number of rounds of the Feistel structure based on a security level; and
    generating the block encryption algorithm having the determined number of rounds.

11. A non-transitory computer readable storage medium storing a program that is executable by a computer to perform a method comprising:
    generating random values based on a seed value;
    generating a key table including the generated random values;
    applying the generated key table to a round function;

generating a block encryption algorithm having a Feistel structure based on the round function, and encrypting a plaintext data block based on the generated block encryption algorithm, wherein the generating the random values comprises:

determining sizes of the random values based on a size of a memory available for encryption; and generating the random values having the determined sizes of the random values, wherein the generating the block encryption algorithm comprises:

determining a number of branches of the Feistel structure based on a size of the plaintext data block and sizes of the random values, and generating the block encryption algorithm having the determined number of branches.

* * * * *